Sept. 7, 1965 C. N. CHANDLER 3,204,797
SYSTEM FOR HANDLING AND TRANSPORTING CARGO
Filed July 22, 1964 6 Sheets-Sheet 1
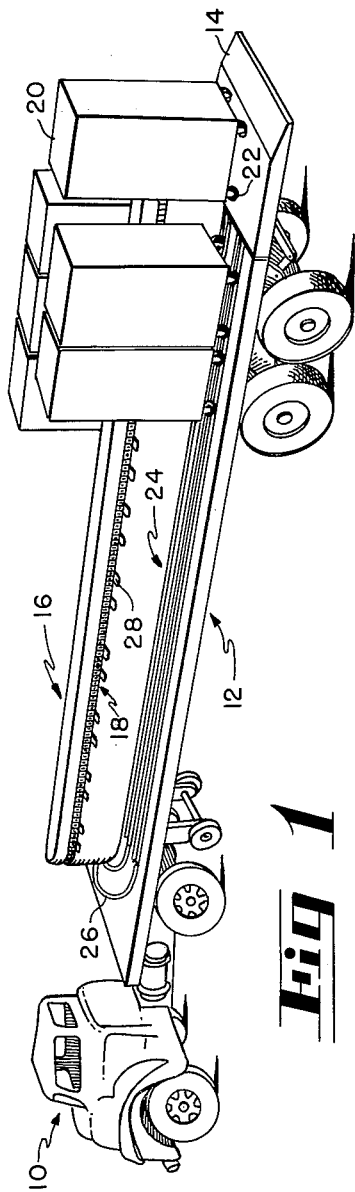
INVENTOR.
COY N. CHANDLER
BY
ATTORNEYS.

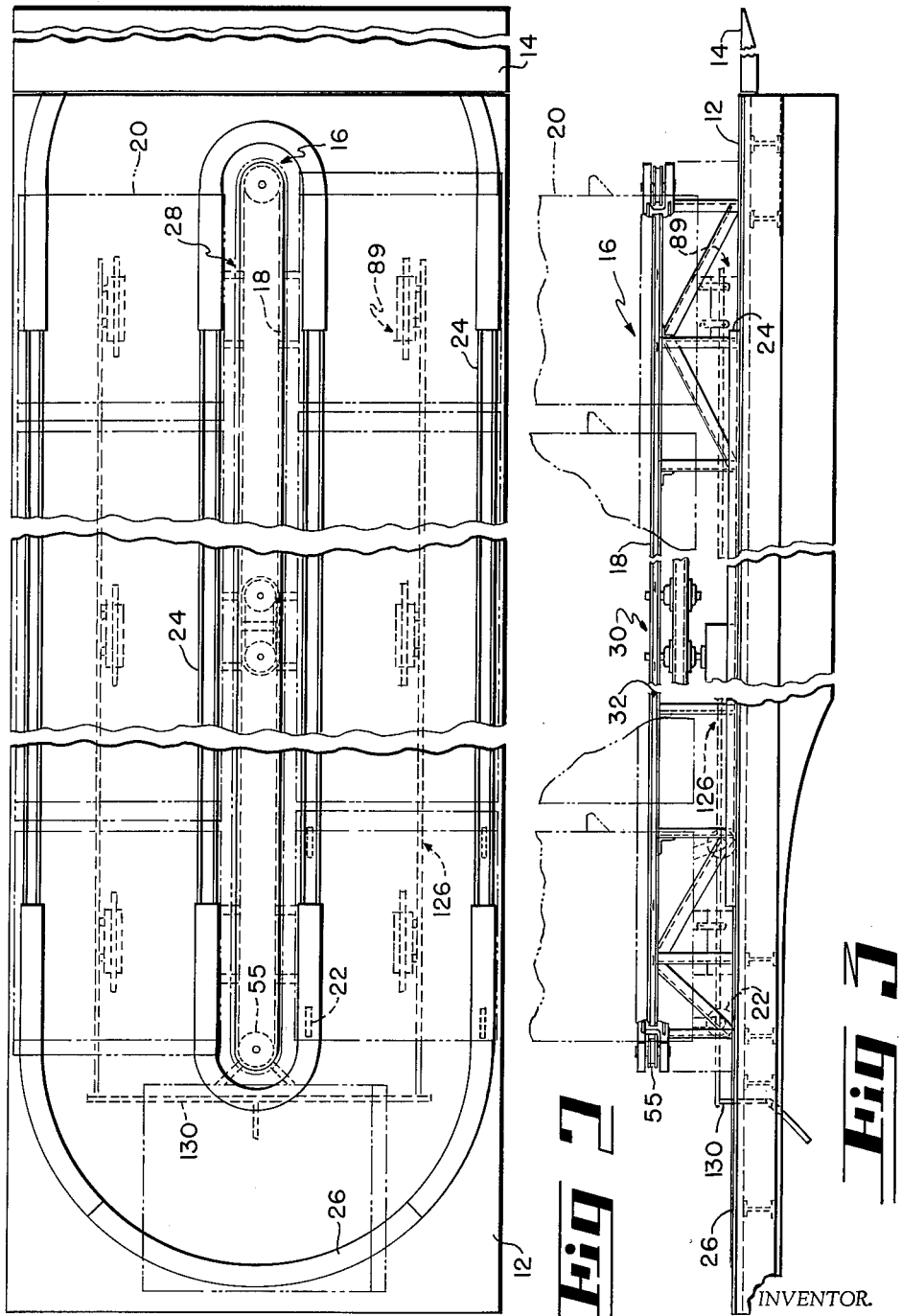

Sept. 7, 1965  C. N. CHANDLER  3,204,797
SYSTEM FOR HANDLING AND TRANSPORTING CARGO
Filed July 22, 1964  6 Sheets-Sheet 3

INVENTOR.
COY N. CHANDLER
BY
ATTORNEYS.

Sept. 7, 1965  C. N. CHANDLER  3,204,797
SYSTEM FOR HANDLING AND TRANSPORTING CARGO
Filed July 22, 1964  6 Sheets-Sheet 4

INVENTOR.
COY N. CHANDLER
BY
ATTORNEYS.

Sept. 7, 1965   C. N. CHANDLER   3,204,797
SYSTEM FOR HANDLING AND TRANSPORTING CARGO
Filed July 22, 1964   6 Sheets-Sheet 6

INVENTOR.
COY N. CHANDLER
BY Alden D. Redfield
Irwin P. Garfinkle
ATTORNEYS.

United States Patent Office 3,204,797
Patented Sept. 7, 1965

3,204,797
SYSTEM FOR HANDLING AND TRANSPORTING CARGO
Coy N. Chandler, Nashville, Tenn., assignor to Avco Corporation, Nashville, Tenn., a corporation of Delaware
Filed July 22, 1964, Ser. No. 384,492
9 Claims. (Cl. 214—518)

This invention relates to cargo-carrying vehicles, and more particularly to flat-bed type carriers on which cargo may be rotated from a loading position to any other position on the carrier.

The system is characterized in that it utilizes standardized containers which are loaded by means of an elevator-type platform onto the rear of a flat-bed, and positioned by means of a rotatable endless cable supported along the length of the carrier, the cable driving the containers to selected positions on the flat-bed, the elevator being in the path of travel of the containers.

Generally, the invention utilizes a conventional flat-bed trailer on which a rotatable, elongated, endless roller-chain type cable is supported. The endless cable extends lengthwise along the trailer-bed at the center thereof. Wheeled, standardized containers are loaded onto the trailer by means of an elevator located at the trailer's rear, and are connected to the endless cable. When the cable is rotated, the containers are moved from the rear along one side of the trailer towards the front, thence in an arc at the front of the trailer to the opposite side of the trailer and back towards the rear and onto the elevator which is located in the path of travel of the containers. Tracks may be mounted on the trailer for guiding the wheels of the containers in their circuitous path around the trailer flat-bed. The system includes unique clamp-down mechanisms for simultaneously retaining each of the containers in a selected position.

It is an object of this invention to provide a flat-bed carrier having elevator means for loading containers onto the flat-bed and for driving the containers in a circuitous path around the flat-bed of the carrier to selected positions, the elevator being in the circuitous path.

Another object of this invention is to provide a flat-bed carrier for standardized wheeled containers movable in a circuitous path around the carrier flat-bed, means being provided for simultaneously clamping down each of the containers for securing the containers during transportation.

Still another object of this invention is to provide an endless drive for moving containers in a circuitous path around the flat-bed of a carrier.

Another object of this invention is to provide tracks in the circuitous path of the containers for guiding the wheels of the containers.

Another object of this invention is to provide a system in which the maximum load capacity of a flat-bed carrier is utilized, at the same time permitting the selective loading and unloading of the carrier from the rear without the need for special handling equipment at the loading or unloading site.

For other objects and for a clearer understanding of the precise nature of the invention, reference should now be made to the accompanying drawings in which:

FIGURE 1 is a perspective representation of the invention showing a plurality of containers mounted on the flat-bed of a semitrailer carrier, one of the containers being shown positioned on the elevator of the carrier;

FIGURE 2 is a plan view, partly broken away, of the flat-bed and elevator;

FIGURE 3 is a side view, partly broken away of FIGURE 2;

Figure 4:
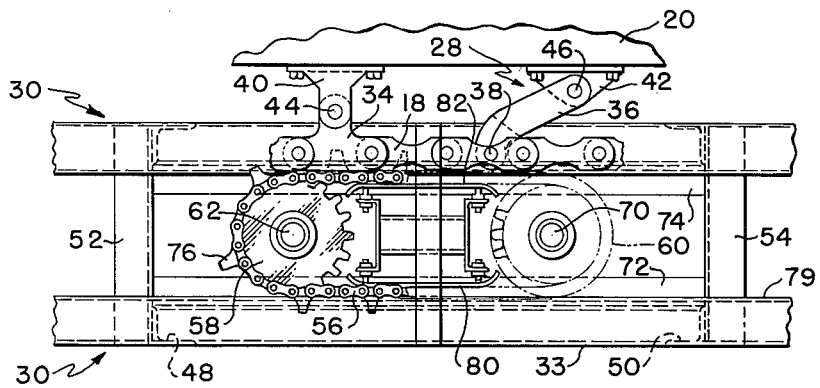
FIGURE 4 is a plan view of the container drive mechanism with the cover removed.
Figure 5:
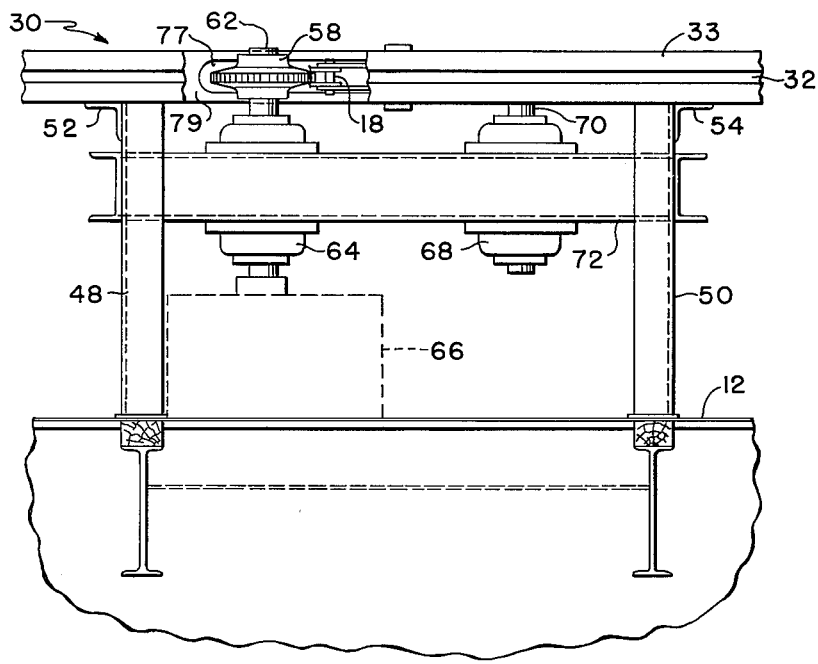
FIGURE 5 is a side view of FIGURE 4.
Figure 6:
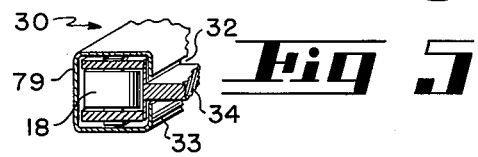
FIGURE 6 shows a detail of the drive mechanism.

Referring first to FIGURE 1, there is shown a conventional tractor 10 for pulling a semitrailer having a flat-bed 12. The semitrailer is provided at its rear with a conventional power-driven elevator 14. A container drive mechanism, generally indicated at 16 and including an endless roller-chain type cable 18, is positioned along the flat-bed 12 at the center thereof, and extends from the rear of the flat-bed 12 to a position adjacent the front, sufficient space on the flat-bed being provided for permitting the passage of containers 20 in an arcuate path around the front of the flat-bed. The containers 20 are each provided with offset swivel-type wheels 22 which are guided in longitudinally extending pairs of tracks 24 provided on each side of the flat-bed 12. A pair of steel plates 26 joining with the two pairs of tracks 24 and following the arcuate path of the containers 20 is provided for eliminating wear and to provide a smooth rolling surface on the flat-bed. The containers are fastened to the endless roller-chain type cable 18 by means of linkages 28 hereinafter to be described in detail.

In a loading operation, the elevator 14 is lowered to the level of the containers, located on the ground or on a platform, from which the containers are rolled onto the elevator. After raising the elevator 14 to the level of the flat-bed 12, the container is attached by means of the linkages 28 to the endless roller-chain type cable 18, which is actuated to rotate in a horizontal plane, driving the container 20 into the guide tracks 24 on the flat-bed. The elevator may then be moved to its storage position, which may be under the flat-bed or vertical, depending upon the type of elevator used, or another loading operation may follow.

For unloading, the elevator is returned to its horizontal position at the level of the flat-bed 12, and the cable 18 is rotated until the selected container has been driven onto the elevator 14 which is in the circuitous path of travel of the containers. The container is then detached from the linkages 28 and the elevator is lowered to ground or platform level. The container may then be rolled from the elevator 14.

Certain of the details of the system are shown in FIGURES 2–5, to which reference should now be made. There the containers 20, drawn in phantom line, are positioned along both sides of the flat-bed 12, one of the containers being positioned at the forward end of the flat-bed. The endless roller-chain type cable 18 is supported for rotation in a horizontal plane within a continuous box-type beam 30 having a continuous slot 32 in its outer side wall 33 through which the linkages 28 to the containers project. The linkages 28 provided at each container location on the cable 18 comprise two projections which extend through the slot 32. One of the projections is a fixed lug 34, and the other is an arm 36 pivoted to the roller-chain type cable at 38. The container 20, provided with lugs 40 and 42, are pivotally secured to the lug 34 and arm 36, respectively, by means of pins 44 and 46. The slotted box beam 30 is supported above the trailer-bed by means of conventional beam structures, such as indicated at 48, 50, 52, and 54.

Figure 7:
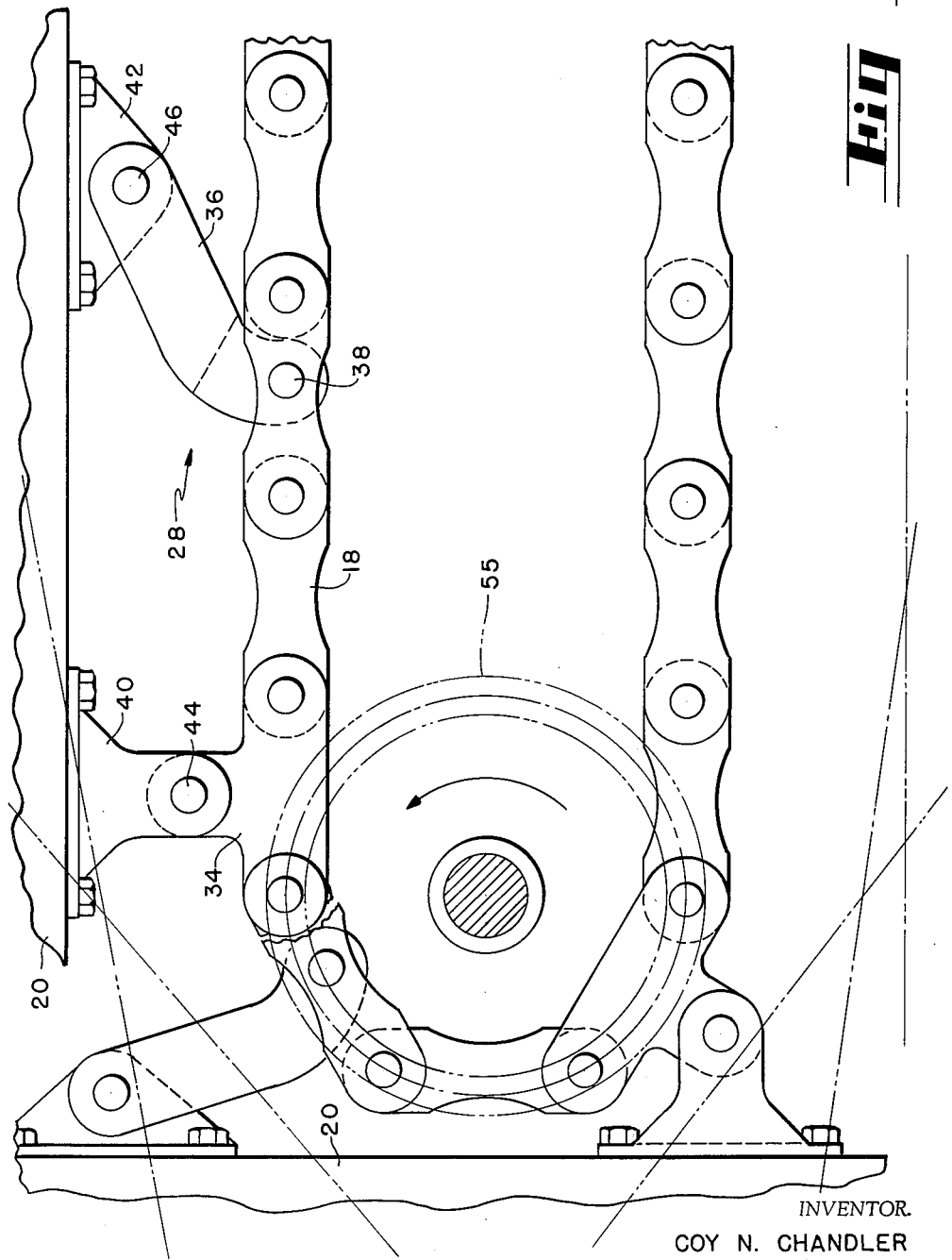
FIGURE 7 shows a portion of the endless roller-chain type cable connected to containers.

As seen in FIGURE 7, an idler sprocket 55 for the chain-link cable 18 is positioned at both ends of the flat-bed 12, and the cable is rotated between these positions. However, the cable 18 is driven by a second endless roller-chain drive 56 located approximately at the center of the trailer-bed 12. The endless drive 56 is provided with projecting lugs 76 which extend through a slot 77 in the inner side wall 79 of the box beam 30. The slot 77 need only be co-extensive with the roller-chain drive 56. The lugs 76 engage within the chain links of the cable 18 and serve to rotate the cable 18. The lugs 76 of the drive 56 are maintained in positive engagement within the links of the cable 18 by means of pressure exerted against the cable by means of spring-type members 80 and 82 suitably supported between the beams 72 and 74.

The drive 56 is rotated by means of a drive sprocket 58 around an idler sprocket 60. The shaft 62 of the sprocket 58 is driven through a reduction gear and bearing retainer 64 by means of a motor 66. The bearing retainer 64 for the shaft 62 as well as a bearing retainer 68 for a shaft 70 of the idler gear 60 are supported from between a pair of I-beams 72 and 74.

It will be understood that under appropriate circumstances the drive for the cable may comprise a motor connected to either sprocket 55 and the chain drive 56 may be eliminated. However, the chain drive 56 does serve to better distribute the drive forces since several lugs 76 will be engaged simultaneously to drive the cable 18, whereas fewer sprocket teeth will be so engaged.

The connection of the containers 20 at the removable pins 44 and 46 to the chain link cable 18 serves to provide some security for the containers during transportation. However, in order to positively tie the containers to the flat-bed 12, an I-beam 84 is secured by bolting, welding, or other means (not shown) to the bottom of each of the containers 20, each of the I-beams 84 extending in the direction of container travel along the flat-bed. A clamp-down mechanism 89 is provided at each container station for cooperating with the upper surface 86 of the base 87 of the I-beam 84.

The clamp-down mechanism comprises two spaced channels 88 and 90, the bottom end portions of which are bridged by plates 92 and the ends of which are bridged by plates 93. Welding of the plates 92 and 93 to each of the channels 88 and 90 forms a slotted box beam within which the base 87 of the I-beam 84 may travel as the containers 20 move along the length of the flat-bed 12. Brake shoes 91 are secured, by cementing or riveting to the inner surfaces of the channels 88 and 90 in positions opposing the surfaces 86 of the I-beam 84.

Each of the plates 92 is apertured to receive a shaft 94 supported from the flat-bed 12. A coil spring 96 on the shafts 94 urges the box-like structure to an up position where the brake shoes 91 are out of engagement with the surfaces 87 of the I-beam 84.

For actuating the mechanism downwardly so that the brake shoes 91 contact the surfaces 86, two cams 98 are supported within the box-like structure adjacent each of its ends on shafts 100 extending through vertical slots 101 in the channels 88 and 90. The cams, which are steel cylinders, are fixedly secured to the shafts 100 by means of pins 102 with their axes off center from the axis of the shaft 100.

Figure 8:
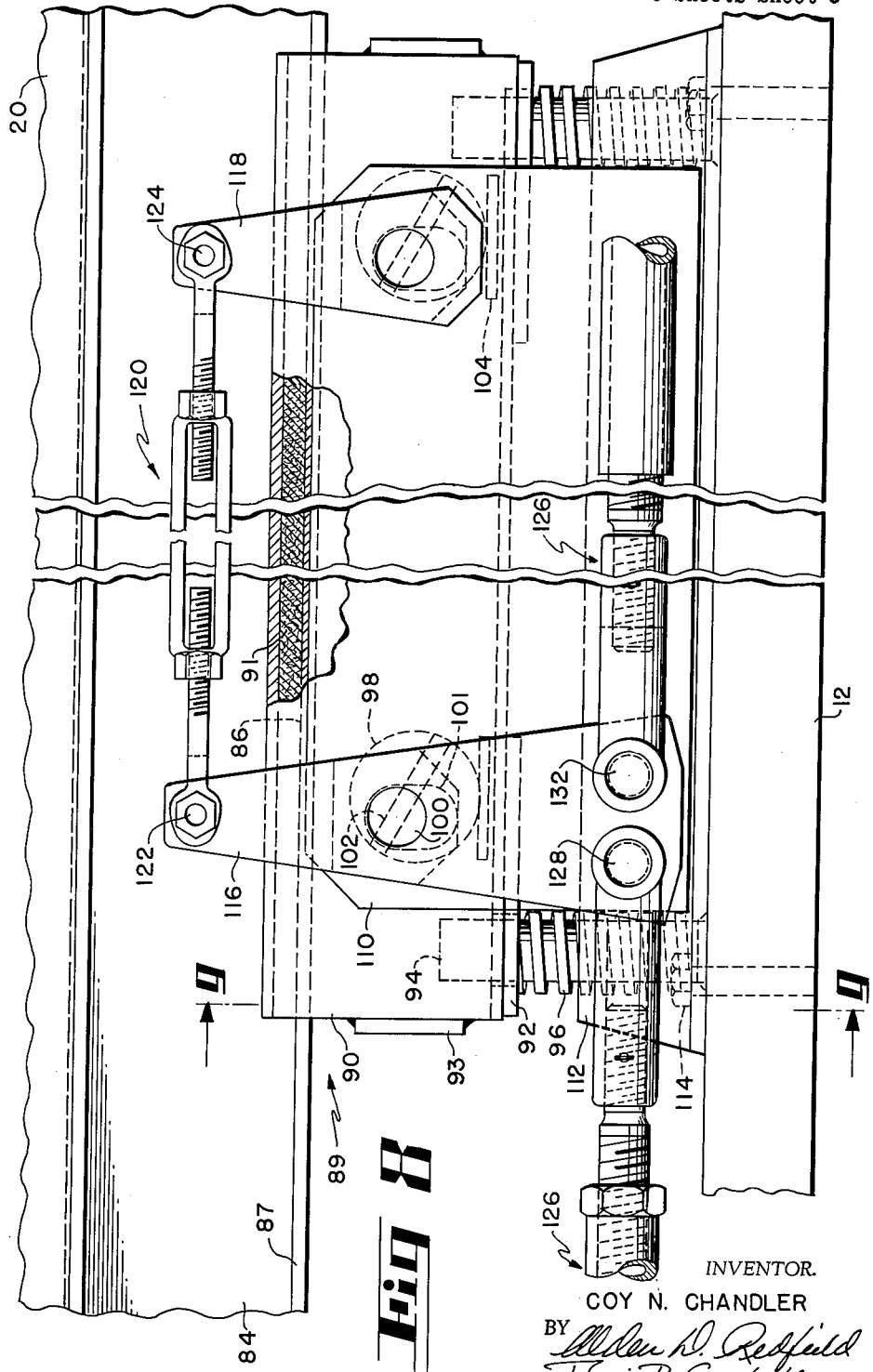
FIGURES 8 and 9 are views showing the tie-down mechanism for the containers.
Figure 9:
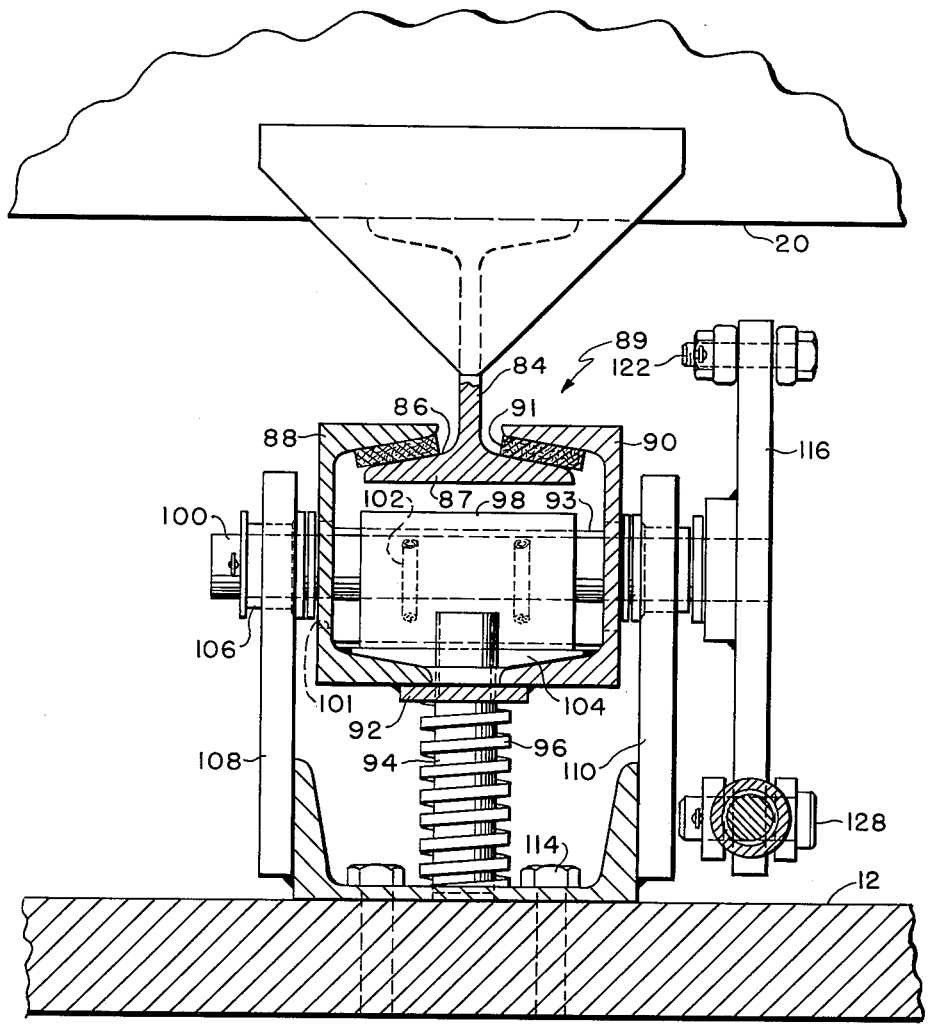

A plate 104 welded across the interior bottom portions of the channels 88 and 90 are positioned adjacent the cams 98. When the cams are rotated clockwise, as viewed in FIGURE 8, the cam surface bears against the plates 104, forcing the entire structure downwardly against the spring 96.

The shafts 100 are rotatably supported in bearings 106 by means of a frame-like structure comprising plates 108 and 110 and a channel 112 bolted to the flat-bed at 114. The cams 98 along with the shafts 100 are rotated by means of cranks 116 and 118, respectively, to which the shafts 100 are fixed. The uppermost portions of the cranks 116 and 118 are coupled together by means of an adjustable length linkage 120, the ends of which are pivoted to the cranks at 122 and 124, respectively. The bottom portion of the crank 116 is driven in a fore and aft direction by means of an adjustable length rod 126 pivoted at 128. In addition, the crank 116 at each station is interconnected with a crank 116 at every other station along the same side of the flat-bed by means of similar adjustable length rods 126 pivoted to the crank at 132. Thus, as the rod 126 is moved longitudinally to the left, as viewed in FIGURE 8, the crank 116 is rotated clockwise, as is the crank 118, and the cam 98 is rotated clockwise into the position shown, driving the brake shoes 91 into engagement with the surface 86 of the I-beam 84. The same clamp-down action occurs essentially simultaneously at each of the containers. Suitable levers 130 (shown schematically in FIGURES 2 and 3) are connected to the rods 126 from under the flat-bed for actuating all the rods simultaneously, and also for maintaining the rods in the clamped-down position to prevent releasing of the cams during transportation.

In the design of the tie-down mechanism it is important that the length of the I-beam 84 be made substantially longer than the length of the structure 89 so as to reduce the tolerances required for indexing the positions of the containers before latching down; that is to say, so long as the I-beams 84 are positioned so that the entire brake surface 91 may engage the surface 86, the containers may be adequately clamped down.

Various modifications and adaptations will at once be apparent to persons skilled in the art. For example, the configuration of the clamp-down structure 89 may be altered, and the use of other mechanisms for driving the brake shoes into engagement with the surfaces 86 are available. The invention also contemplates the automatic indexing of the motor 66 for stopping the containers at indexed stations. It is intended, therefore, that this invention be limited only by the following claims as interpreted in the light of the prior art.

What is claimed is:

1. In a cargo transporting system, the combination comprising:
    a cargo carrier having a generally rectangular flat-bed;
    a vertically movable normally horizontal platform at the rear of said carrier, said platform being movable between the level of the flat-bed to another level;
    a plurality of containers;
    an endless cable supported for rotation in a horizontal plane, said cable extending from the rear of said flat-bed along the center therof to a position adjacent the front of said flat-bed;
    means for releasably locking each of said containers to said cable at various positions along said cable; and
    drive means for driving said cable in said plane whereby said containers are driven in a circuitous path around said flat-bed, said platform, when at the flat-bed level, being in said path.

2. The invention as defined in claim 1, and clamping means for simultaneously rigidly securing each of said containers to said flat-bed, said clamping means comprising first longitudinally extending means supported from the bottom of each container and second longitudinally extending means supported from said flat-bed, said first longitudinally extending means on each of said containers being releasably, frictionally engageable with said second longitudinally extending means supported from said flat-bed.

3. The invention as defined in claim 2 wherein each of said first longitudinally extending means includes a horizontally disposed surface, and where said second longitudinal extending means is a vertically movable clamp supported from said flat-bed, said clamp being releasably engageable with said horizontally disposed surface of each of said first longitudinally extending means.

4. The invention as defined in claim 3 wherein said clamping means is entirely within the downward projection of said containers.

5. The invention as defined in claim 1 wherein said endless cable is of the roller-chain type having projecting linkages at said various positions; and removable pivotal connections between the respective containers and said linkages.

6. In a cargo transporting system, the combination comprising:
- a cargo carrier having a generally rectangular flat-bed;
- a vertically movable normally horizontal platform at the rear of said carrier, said platform being movable between the level of the flat-bed to another level;
- a plurality of containers;
- an endless cable supported for rotation in a horizontal plane, said cable extending from the rear of said flat-bed along the center thereof to a position adjacent the front of said flat-bed;
- means for releasably securing each of said containers to said cable at various positions along said cable;
- drive means for driving said cable in said plane whereby said containers are driven in a circuitous path around said flat-bed, said platform, when at the flat-bed level, being in said path;
- and clamping means for each of said containers for rigidly securing each of said containers to said flat-bed, said clamping means comprising a horizontally disposed braking surface secured to the bottom of each of said containers, and a vertically movable brake shoe at selected positions along the length of said flat-bed, the lower surface of each of said brake shoes being engageable with said braking surface when downwardly actuated.

7. The invention as defined in claim 6 wherein said clamping means is entirely within the downward projection of said containers.

8. In a cargo transporting system, the combination comprising:
- a cargo carrier having a generally rectangular flat-bed;
- a vertically movable normally horizontal platform at the rear of said carrier, said platform being movable between the level of the flat-bed to another level;
- a plurality of containers;
- an endless cable supported for rotation in a horizontal plane, said cable extending from the rear of said flat-bed along the center thereof to a position adjacent the front of said flat-bed, said endless cable being of the roller-chain type having projecting linkages at said various positions;
- means for releasably securing each of said containers to said cable at various positions along said cable, said means for releasably securing each of said containers comprising removable pivotal connections between the respective containers and said linkages;
- a drive means for driving said cable in said plane, said drive means comprising a second endless cable of the roller-chain type, said second endless cable being supported for rotation in the same plane as the first cable and within the periphery thereof, said second endless cable having projections engageable within the links of the first cable, spring means maintaining the projections of said second cable within the links of the first cable, and a motor driven sprocket for driving said second endless cable, whereby said containers are driven in a circuitous path around said flat-bed, said platform, when at the flat-bed level, being in said path;
- and clamping means for each of said containers for rigidly securing each of said containers to said flat-bed, said clamping means comprising a horizontally disposed braking surface secured to the bottom of each of said containers, and a vertically movable brake shoe at selected positions along the length of said flat-bed, the lower surface of each of said brake shoes being engageable with said braking surface when downwardly actuated.

9. The invention as defined in claim 8 wherein said clamping means is entirely within the downward projection of said containers.

References Cited by the Examiner
UNITED STATES PATENTS

| | | | |
|---|---|---|---|
| 1,591,655 | 7/26 | Callison | 214—28.44 |
| 2,166,948 | 7/39 | Fitch | 105—366 |
| 2,530,786 | 11/50 | Rose | 198—203 X |
| 2,709,014 | 5/55 | Soles | 214—518 |
| 2,809,744 | 10/57 | Hapman | 198—203 |
| 2,849,127 | 8/58 | Densmore. | |
| 2,866,537 | 12/58 | Immesberger | 198—181 |

HUGO O. SCHULZ, *Primary Examiner.*

GERALD M. FORLENZA, *Examiner.*